(12) United States Patent
Schreiber et al.

(10) Patent No.: US 8,246,478 B2
(45) Date of Patent: Aug. 21, 2012

(54) ENGINE SHAFT IN THE FORM OF A FIBER-COMPOSITE PLASTIC TUBE WITH METALLIC DRIVING AND DRIVEN PROTRUSIONS

(75) Inventors: Karl Schreiber, Am Mellensee (DE); Raimund Grothaus, Dresden (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 334 days.

(21) Appl. No.: 12/613,164

(22) Filed: Nov. 5, 2009

(65) Prior Publication Data
US 2010/0113171 A1    May 6, 2010

(30) Foreign Application Priority Data
Nov. 5, 2008    (DE) .......................... 10 2008 056 002

(51) Int. Cl.
*F16D 1/068*    (2006.01)
(52) U.S. Cl. .................. 464/181; 464/183; 156/172
(58) Field of Classification Search .................. 464/181, 464/183; 156/172, 173, 175, 169, 148, 149
See application file for complete search history.

(56) References Cited

U.S. PATENT DOCUMENTS

| | | | |
|---|---|---|---|
| 534,904 A * | 2/1895 | Morris | 464/183 |
| 3,021,241 A * | 2/1962 | Bendarzewski et al. | 156/173 |
| 4,118,262 A * | 10/1978 | Abbott | 156/175 |
| 4,185,472 A | 1/1980 | Yates et al. | |
| 4,248,062 A * | 2/1981 | McLain et al. | 464/181 |
| 4,260,332 A | 4/1981 | Weingart et al. | |
| 4,704,918 A | 11/1987 | Orkin et al. | |
| 5,288,109 A * | 2/1994 | Auberon et al. | 156/169 X |
| 5,683,300 A * | 11/1997 | Yasui et al. | 464/181 |
| 5,685,933 A * | 11/1997 | Ohta et al. | 156/175 |
| 2003/0125117 A1* | 7/2003 | Burkett | 464/181 |
| 2008/0064511 A1* | 3/2008 | Brace et al. | 464/181 |
| 2009/0131181 A1* | 5/2009 | Brace et al. | 464/181 |

OTHER PUBLICATIONS

German Search Report dated Nov. 5, 2008 from counterpart German patent application.

* cited by examiner

*Primary Examiner* — Gregory Binda
*Assistant Examiner* — Matthieu Setliff
(74) *Attorney, Agent, or Firm* — Timothy J. Klima; Shuttleworth & Ingersoll, PLC

(57) ABSTRACT

On a low-pressure turbine shaft made of fiber-composite material, the connection to the metallic driven protrusion or the driving protrusion (1), respectively, is made via an adapter (3) formed onto the latter, with pylons (6) extending beyond the circumferential area of the latter and on which the fibers (4) are deflected and guided in accordance with the fiber orientation in the fiber-composite material, enabling high torsional forces to be transmitted via the small connecting zone.

7 Claims, 1 Drawing Sheet

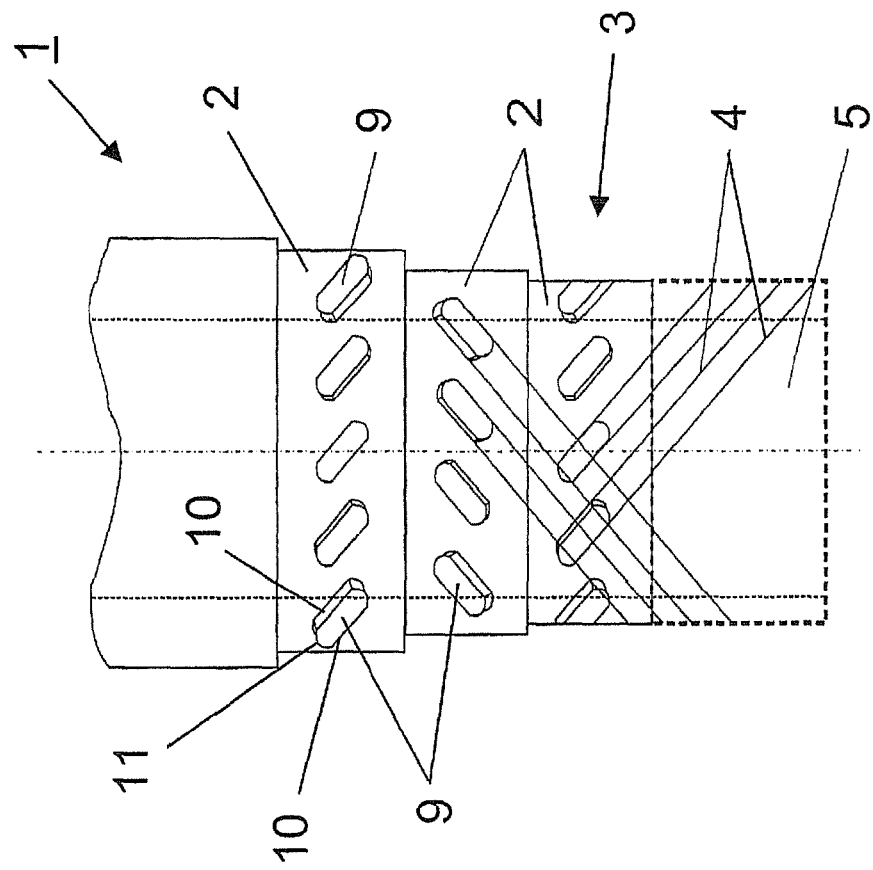
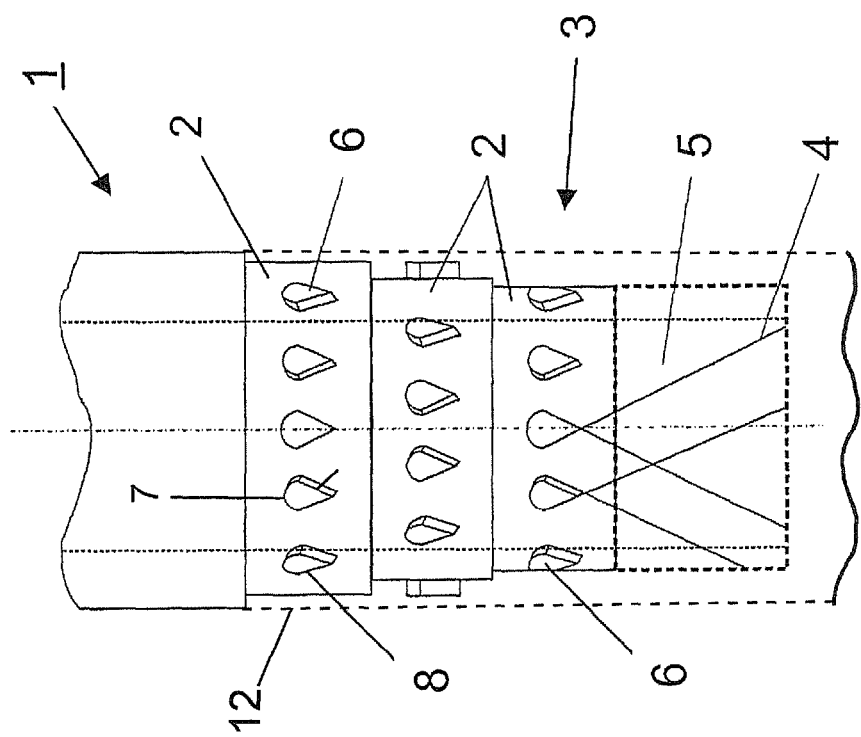
Fig. 2
Fig. 1

ENGINE SHAFT IN THE FORM OF A FIBER-COMPOSITE PLASTIC TUBE WITH METALLIC DRIVING AND DRIVEN PROTRUSIONS

This application claims priority to German Patent Application DE 10 2008 056 002.2 filed Nov. 5, 2008, the entirety of which is incorporated by reference herein.

This invention relates to an engine shaft, in particular the low-pressure turbine shaft or the radial shaft for a gas-turbine engine in the form of a fiber-composite plastic tube provided with metallic driving and driven protrusions, and especially deals with the provision of a connecting zone between the fiber-composite material and the metallic driving and driven protrusions.

The low-pressure turbine shaft, which is arranged concentrically in the hollow intermediate-pressure turbine shaft—or in the high-pressure turbine shaft on a two-spool gas-turbine engine—and is provided at its ends with a load-input element and a load-output element for connection to the fan and the low-pressure turbine has smaller diameter, greater length, lower speed and higher loading, as compared with the other two shafts. Accordingly, the low-pressure turbine shaft is a highly loaded, critical engine component which, on the one hand, shall not fail under any circumstances and, on the other hand, shall have smallest possible outer diameter to permit the use of rotor disks with smallest possible inner diameter to provide lightweight and powerful engines.

The requirements on the low-pressure turbine shaft apply similarly to the radial shaft of the gas-turbine engine connecting an internal and external gear drive, with the radial shaft being driven at both ends, although always in the same direction. As a consequence, different, but high torques, are applied to the radial shaft. Like the low-pressure shaft, the radial shaft must be designed as slender as possible.

In order to enable high torques to be transmitted, while keeping with reduced weight and limited outer diameter, an engine shaft in the form of a fiber-composite plastic tube is concurrently proposed in a patent application having the same priority date and assigned to the same assignee as the present application and which is made of several fiber layers with different fiber orientation and which also has a load-input element and a load-output element connected to its respective ends. One feature of the hollow engine shaft made of fiber-composite material lies in the specific orientation of the fibers which, in the inner wall area, are arranged at an angle suitable for the transmission of torsional forces and, in the outer wall area, at an angle providing the stiffness of the fiber-composite plastic tube, and in the provision of at least the load-output element and, if applicable, also the load-input element in the form of a metallic driving or driven protrusion necessarily made of steel to provide the hardness required. Here, a firm connection between the metallic driving and driven protrusions and the fiber-composite material of the low-pressure shaft or the radial shaft providing for transmission of the high torques between the metallic component and the fiber material is difficult to achieve in the relatively small connecting zone as these differ distinctly in their physical properties, for example modulus of elasticity and thermal coefficient of expansion.

The present invention, in a broad aspect, provides for a design of the connection between the fiber-composite plastic tube and the metallic driving or driven protrusion such that safe transmission of the high forces between the driving and driven protrusions made of metallic material and the engine shaft in the form of a fiber-composite plastic tube is ensured.

In other words, the present invention in its essence provides for a special wrapping of the metallic driven/driving protrusion with the fibers of the fiber-composite plastic tube such that the fibers are placed around, guided on and fixed to a multitude of pylons provided on the outer circumference of an adapter connected to the driven and/or driving protrusion. Winding the fibers around the pylons enables the high loads to be transferred from each of the fibers of the fiber-composite plastic tube (engine shaft) into the small, diametrically limited connecting zone of the metallic driven protrusion or to be introduced from the driving protrusion into the fiber material and, in particular, the high torsional forces to be transmitted from the fiber material to the driven protrusion.

In a further development of the present invention, the adapter formed onto the driven/driving protrusion is conically tapered, so that a transition gradually adapted to the material thickness is provided from a dominant fiber-material area to a dominant metallic area enabling high shearing stresses to be taken up. In particular the combination of shaft-type design and pylons enables high forces to be transmitted between the fiber material and the metallic material, despite the connecting zone being small.

In an advantageous further development of the present invention, several annular rows of pylons are arranged in successive steps on the circumferential area of the adapter. The pylons are arranged offset, i.e. in staggered arrangement relative to the pylons of an adjacent step.

In a further embodiment of the present invention, the pylons have a deflecting curvature for gently deflecting the fibers and two side faces arranged at a specific angle whose orientation is adapted to the respective fiber orientation in the fiber-composite plastic material.

In a further embodiment of the present invention, the pylons are approximately drop-shaped with side faces extending at an acute angle to each other, with the angle included by the side faces corresponding to the respective, positive or negative, fiber orientation in the respective wall area of the fiber-composite plastic tube. According to yet another feature of the present invention, the pylons are approximately rectangularly shaped, with the side faces thereof extending parallel to each other, and, in the respective step of the adapter, being oriented in accordance with the respective, positive or negative, fiber direction in the fiber-composite plastic tube.

In development of the present invention, only the fibers of fiber layers of the fiber-composite plastic tube which take up the torsional forces to be transmitted are held and guided on the pylons.

According to a further feature of the present invention, first pylons are provided around which the inner fiber layers are wound, with the first pylons having short length and high carrying capacity and being directly connected to the adapter, for example in adapter holes by interference fit, as well as second pylons around which the following, outer fiber layers are wound and which provide for positive guidance, with the second pylons having greater length and being provided with a root in the form of a perforated plate and being attached to the adapter by means of a retaining ring. The perforated plate is placed on the inner fiber strand and connected to the latter via holes. The perforated disk can cover the area between the first and the second pylons.

Furthermore, a tangential 90°-fiber winding, i.e. a winding extending vertically to the longitudinal direction, can be provided between the pylons on the outer circumference of the connecting zone formed by the adapter and the fiber material to provide for high compression of the fibers in this area and improve the damage behaviour of the engine shaft.

The driven and the driving protrusions including the adapters are made of steel or other metal having a specific hardness. Preferably, the adapter is made of a titanium alloy and welded to the driven/driving protrusion made of steel of a specific hardness.

The present invention is more fully described in light of the accompanying drawings showing a preferred embodiment. In the drawings, FIG. 1 is a top view of a fragmentarily illustrated driven or driving protrusion with adjoining winding core, and FIG. 2 is a top view of a further embodiment of the driven/driving protrusion as per FIG. 1.

The driven protrusion 1, which is only partly illustrated herein, is made of steel or other metal to provide the hardness required and connected to an adapter 3 tapering—here in several steps 2—towards the fiber-composite plastic tube 12 to provide connection with the carbon fibers of the latter. Following the tapered end of the adapter 3, a winding core 5 is arranged which is required for winding the carbon fibers 4 and is subsequently removed. Cross-sectionally drop-shaped pylons 6, i.e. retaining tangs for fixing and deflecting the carbon fibers 4, are equidistantly formed onto the outer circumference of the individual steps 2. In the rows of pylons succeeding each other in the steps 2, the pylons 6 are arranged offset, i.e. in staggered arrangement relative to each other. Furthermore, the pylons 6 are designed such that the carbon fibers 4, when wound at the deflecting curvature 7 of the pylons, are deflected and retained over a large radius and, along the side faces 8 of the pylons, at a specific negative angle opposite to the approaching positive angle. While the carbon fibers 4 of the outer wall area of the low-pressure turbine shaft, which extend essentially longitudinally, i.e. at an angle ranging from +/−5° to +/−12°, to attain high stiffness, are placed around the pylons 6 of the respective step 2 with larger diameter, the carbon fibers in the following wall area, which extend more transversely to the longitudinal axis, for example at an angle of +/−35° to +/−45°, to take up the torsional forces, are wound around the pylons 6 of the steps 2 with smaller diameter. The angle included by the side faces 8 of the drop-shaped pylons 6 agrees with the positive and negative fiber orientation angle in the respective wall area of the fiber-composite plastic tube of the low-pressure turbine shaft, i.e. the pylons 6 in a step 2 with large diameter are more slender (smaller angle between the side faces 8) than the pylons 6 in a step 2 with small diameter.

The tapering adapter 3 is made of a titanium alloy, here TiAl6V4, which in terms of thermal elongation and elasticity is better suited to the physical properties of the carbon fibers than steel.

As shown in FIG. 2, also the pylons 9 can be provided with side faces 10 extending parallel to each other. In this case, the pylons 9 are arranged in the respective step 2 at an angle corresponding to the respective—positive or negative—fiber orientation in the fiber-composite plastic tube and are—except for a deflecting curvature 11—essentially rectangularly shaped, so that upon deflection the carbon fibers extend in the same—either positive or negative—direction as they did before deflection.

The type of connection described hereinbefore enables very high loads to be transmitted from the diameter of the low-pressure turbine shaft made of fiber-composite material which is limited to 100 mm via a relatively small connecting zone to the metallic driven protrusion 1 connected to the fan of a gas turbine engine—or vice versa from the driving protrusion to the fiber-composite material.

While the inventive concept provides for direct transmission of force from the fibers via the pylons 6, 9 to the driven protrusion 1 (or from a non-illustrated driving protrusion via the pylons to the fibers), the present invention is not limited in application to the embodiments described hereinbefore. For instance, the pylons can have other shapes as well. One feature is the principally shaft-type connection between the driven protrusion or the driving protrusion, respectively, and the fiber-composite material via the tapering adapter 3 whose taper can also be stepless. As a result of the gradual transition between fiber material and adapter, or the gradually decreasing or increasing material thickness of the two connection partners, shearing stresses in the connecting zone are kept low and transmitted evenly, with the forces between the two connecting components being determined by the respective stronger, dominant component (tapering part of driven protrusion or fiber-composite plastic tube). On the side of the deflecting curvature 7, 11, depressions can be formed into the surface of the steplessly tapering adapter 3 to retain stepping and enable the fiber material to be completely wound around the pylons 6, 9. In addition, it is also possible that the outer fiber layers extending essentially in the longitudinal direction of the low-pressure turbine shaft and not being intended to transmit torsional forces are not wound around pylons. Finally, a tangential fiber winding can additionally be applied to the fiber material in the area of the connecting zone to build up pressure and improve the damage behavior in this area.

LIST OF REFERENCE NUMERALS

1 Driving protrusion
2 Steps of 3
3 Adapter
4 Carbon fibers
5 Winding core
6 Pylon (drop-shaped)
7 Deflecting curvature of 6
8 Side faces of 6
9 Pylon (rectangularly shaped)
10 Side faces of 9
11 Deflecting curvature of 9

What is claimed is:

1. An engine shaft, comprising:
a fiber-composite tube;
at least one of a metallic driving and driven protrusions;
an adapter integrally connected to the at least one of the driven and the driving protrusions, the adapter having a plurality of protruding pylons arranged on a circumferential area of the adapter, on which fibers of the fiber-composite tube can be deflected, guided and retained for connecting the fiber-composite tube to the adapter and transmitting load between the protrusion and the fiber-composite tube;
wherein the pylons each have a deflecting curvature oriented longitudinally outwardly for gently deflecting the fibers and two side faces arranged at a specific angle whose orientation is adapted to a respective fiber orientation in the fiber-composite tube;
wherein the pylons are approximately drop-shaped with the two side faces extending from opposite sides of the deflecting curvature toward one another such that the two side faces are oriented at an acute angle to each other with a vertex of the angle oriented longitudinally inwardly, with the angle included by the two side faces corresponding to the respective fiber orientation in the fiber-composite tube;
wherein each fiber wraps fully wraps around the deflecting curvature and each of the two side faces to cross over itself adjacent the vertex such that opposite ends of the fiber extend away from one another from the cross over point along the respective fiber orientation.

2. The engine shaft of claim 1, wherein the adapter is tapered such that there is a gradual transition between a dominant fiber area to a dominant metallic area.

3. The engine shaft of claim 2, wherein the adapter is tapered in a plurality of steps with rows of pylons arranged on the plurality of steps on the circumferential area of the adapter.

4. The engine shaft of claim 3, wherein pylons of one row are arranged offset to pylons of an adjacent row.

5. The engine shaft of claim 1, wherein only fibers of fiber layers of the fiber-composite tube which take up torsional forces are held and guided on the pylons.

6. The engine shaft of claim 1, wherein the at least one of the driven protrusion and the driving protrusion and the adapter are made of steel having a specific hardness.

7. The engine shaft of claim 1, wherein the at least one of the driven protrusion and the driving protrusion is made of steel of a specific hardness and the adapter welded to the protrusion is made of a titanium alloy.

* * * * *